(12) United States Patent
Prause et al.

(10) Patent No.: US 11,305,498 B2
(45) Date of Patent: Apr. 19, 2022

(54) SYSTEM AND METHOD FOR FABRICATING A COMPOSITE PLY LAYUP

(71) Applicant: The Boeing Company, Chicago, IL (US)

(72) Inventors: Richard A. Prause, Charleston, SC (US); Andrew E. Modin, Charleston, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/229,222

(22) Filed: Dec. 21, 2018

(65) Prior Publication Data

US 2020/0198261 A1 Jun. 25, 2020

(51) Int. Cl.
| | |
|---|---|
| *B29C 70/06* | (2006.01) |
| *B29C 70/34* | (2006.01) |
| *B29C 70/38* | (2006.01) |
| *B29C 70/46* | (2006.01) |
| *B29C 70/54* | (2006.01) |

(Continued)

(52) U.S. Cl.
CPC ............ *B29C 70/388* (2013.01); *B29C 70/06* (2013.01); *B29C 70/34* (2013.01); *B29C 70/46* (2013.01); *B29C 70/541* (2013.01); *B29C 70/545* (2013.01); *B29C 2037/903* (2013.01); *B29C 2791/002* (2013.01); *B29C 2793/0027* (2013.01); *B29C 2793/0072* (2013.01); *B29C 2793/0081* (2013.01); *B29L 2031/3076* (2013.01); *Y10T 156/1075* (2015.01)

(58) Field of Classification Search
None
See application file for complete search history.

(56) References Cited

U.S. PATENT DOCUMENTS

| | | | |
|---|---|---|---|
| 3,983,282 | A | 9/1976 | Seemann |
| 4,016,022 | A | 4/1977 | Browning |

(Continued)

FOREIGN PATENT DOCUMENTS

| | | |
|---|---|---|
| EP | 2796263 | 10/2014 |
| GB | 2490150 | 10/2012 |
| WO | WO 2016005322 | 1/2016 |

OTHER PUBLICATIONS

European Patent Office, Extended European Search Report, App. No. 19209573.5 (dated May 7, 2020).

(Continued)

*Primary Examiner* — Linda L Gray
(74) *Attorney, Agent, or Firm* — Walters & Wasylyna LLC

(57) ABSTRACT

A method is provided for fabricating a composite ply layup with a desired shape. The method includes moving a shuttle having a sheet of elastic material into engagement with at least one composite ply at a ply pickup station, and picking up the at least one composite ply with the shuttle. The method also includes transporting the shuttle and the at least one composite ply from the ply pickup station to a forming station, and moving the shuttle and the at least one composite ply into engagement with a forming tool at the forming station or any previously laid plies on the forming tool. The method further includes compacting the at least one composite ply on the forming tool or any previously laid plies on the forming tool with the shuttle to form the composite ply layup with the desired shape.

30 Claims, 17 Drawing Sheets

(51) Int. Cl.
*B29C 37/00* (2006.01)
*B29L 31/30* (2006.01)

(56) References Cited

U.S. PATENT DOCUMENTS

| | | | |
|---|---|---|---|
| 4,120,632 A | 10/1978 | Stoebrel |
| 4,132,755 A | 1/1979 | Johnson |
| 4,180,608 A | 12/1979 | Del |
| 4,622,091 A | 11/1986 | Letterman |
| 4,726,924 A | 2/1988 | Mittelstadt |
| 4,902,215 A | 2/1990 | Seemann |
| 4,942,013 A | 7/1990 | Palmer |
| 5,052,906 A | 10/1991 | Seemann |
| 5,116,216 A | 5/1992 | Cochran |
| 5,123,985 A | 6/1992 | Evans |
| 5,129,813 A | 7/1992 | Shepherd |
| 5,316,462 A | 5/1994 | Seemann |
| 5,364,584 A | 11/1994 | Imanara |
| 5,427,725 A | 6/1995 | White |
| 5,439,635 A | 8/1995 | Seemann |
| 5,441,692 A | 8/1995 | Taricco |
| 5,576,030 A | 11/1996 | Hooper |
| 5,601,852 A | 2/1997 | Seemann |
| 5,702,663 A | 12/1997 | Seemann |
| 5,721,034 A | 2/1998 | Seemann |
| 5,904,972 A | 5/1999 | Tunis |
| 5,939,013 A | 8/1999 | Han |
| 5,958,325 A | 9/1999 | Seemann |
| 6,090,335 A | 7/2000 | McClure |
| 6,299,819 B1 | 10/2001 | Han |
| 6,391,436 B1 | 5/2002 | Xu |
| 6,406,659 B1 | 6/2002 | Lang |
| 7,186,361 B2 | 3/2007 | Kasai et al. |
| 7,469,735 B2 | 12/2008 | Brown |
| 7,544,261 B1 | 6/2009 | Nogueroles Vines et al. |
| 7,603,017 B2 | 10/2009 | Cianciotto et al. |
| 7,670,525 B2 | 3/2010 | Weidmann et al. |
| 7,871,553 B2 | 1/2011 | Wilkerson et al. |
| 7,975,549 B2 | 7/2011 | Fetzer et al. |
| 7,993,480 B2 | 8/2011 | Anderson et al. |
| 8,066,929 B2 | 11/2011 | Eberth et al. |
| 8,551,380 B2 | 10/2013 | Hawkins et al. |
| 9,387,657 B2 | 7/2016 | Smith, Jr. et al. |
| 9,701,067 B2 | 7/2017 | Hawkins et al. |
| 2006/0059848 A1 | 3/2006 | MacDonald-Schmidt et al. |
| 2006/0216480 A1 | 9/2006 | Weidmann et al. |
| 2006/0249868 A1 | 11/2006 | Brown |
| 2007/0161483 A1 | 7/2007 | Raf |
| 2007/0175575 A1 | 8/2007 | Rubin et al. |
| 2008/0053599 A1 | 3/2008 | Aijima |
| 2009/0008825 A1 | 1/2009 | Eberth et al. |
| 2009/0148647 A1 | 6/2009 | Jones et al. |
| 2009/0239018 A1 | 9/2009 | Aijima |
| 2009/0261199 A1 | 10/2009 | McCarville |
| 2009/0263618 A1 | 10/2009 | McCarville |
| 2010/0080942 A1 | 4/2010 | McCarville et al. |
| 2011/0097554 A1 | 4/2011 | Kehrl et al. |
| 2011/0192541 A1 | 8/2011 | Anderson et al. |
| 2018/0229452 A1* | 8/2018 | Ogale .................... B29C 65/02 |

OTHER PUBLICATIONS

European Patent Office, "Communication pursuant to Article 94(3) EPC," App. No. 19 209 573.5 (dated Feb. 23, 2022).

* cited by examiner

SYSTEM AND METHOD FOR FABRICATING A COMPOSITE PLY LAYUP

FIELD

The present application relates to composite structures and, more particularly, to a system and method for fabricating a composite ply layup.

BACKGROUND

A composite structure is commonly fabricated using a composite ply layup device, a cutting machine, and a forming tool. The cutting machine trims (i.e., cuts) one or more pieces of composite ply material, and the cut pieces are then transported from the cutting location (e.g., cutting machine) and placed on the layup device (e.g., a forming tool). The cut pieces are formed and consolidated on the forming tool to fabricate the composite structure. The trimming or cutting location may coincide with the layup location. The known ways of transporting cut pieces to a forming tool, placing the cut pieces on the forming tool, and then consolidating the cut pieces are labor-intensive and time-consuming, and do not allow for picking up flat plies and then accurately placing the plies on a contoured forming tool. Further, the forming of multiple plies of material can be prone to wrinkling during forming. It would be desirable to overcome drawbacks of known ways of transporting, placing, forming, and consolidating one or more cut pieces of composite ply material on a forming tool to fabricate a composite structure.

SUMMARY

In one aspect, a method is provided for fabricating a composite ply layup with a desired shape. The method comprises moving a shuttle into engagement with at least one composite ply at a ply pickup station, and picking up the first of at one least composite ply with the shuttle. The shuttle includes a sheet of elastic material. The method also comprises transporting the shuttle and the at least one composite ply from the ply pickup station to a forming station, and moving the shuttle and the at least one composite ply into engagement with a forming tool at the forming station or any previously laid plies on the forming tool. The method further comprises compacting the at least one composite ply on the forming tool or any previously laid plies on the forming tool with the shuttle to form the composite ply layup with the desired shape.

In another aspect, a system is provided for fabricating a composite ply layup. The system includes a shuttle having a sheet of elastic material. The shuttle is arranged to (i) pick up at least one composite ply at a ply pickup station, (ii) transport the composite ply to a forming station, and (iii) compact the composite ply on a forming tool or any previously laid plies on the forming tool at the forming station to form the composite ply layup. The system also comprises a controller arranged to control (i) picking and transporting of the composite ply at the ply pickup station based upon sensed ply position information, and (ii) compacting of the composite ply on the forming tool or any previously laid plies on the forming tool at the forming station based upon forming tool position information.

In yet another aspect, a system is provided for fabricating a composite ply layup. The system comprises a laminator at a ply pickup station for laminating one or more sheets of stock material to form at least one composite ply, and a trim head at the ply pickup station for net-trimming the composite ply that has been laminated from one or more sheets of stock material. The system also comprises a flexible forming press at a forming station for compacting a composite ply on a forming tool or any previously laid plies on the forming tool at the forming station. The system further comprises a shuttle arranged to facilitate (i) picking up a composite ply at the ply pickup station, (ii) transporting the composite ply to the forming station, and (iii) compacting the composite ply on the forming tool or any previously laid plies on the forming tool at the forming station to form the composite ply layup while another composite ply is being processed by either the laminator or the trim head at the ply pickup station.

Other aspects will become apparent from the following detailed description, the accompanying drawings and the appended claims.

DETAILED DESCRIPTION

The present application is directed to a system and method for fabricating a composite ply layup (e.g., a layup of net-trimmed composite plies). The specific construction of the system and method therefor and the industry in which the system and method are implemented may vary. It is to be understood that the disclosure below provides a number of embodiments or examples for implementing different features of various embodiments. Specific examples of components and arrangements are described to simplify the present disclosure. These are merely examples and are not intended to be limiting.

By way of example, the disclosure below describes a system and method for fabricating a composite ply layup, which may ultimately be used for fabricating a composite structure (e.g., an airplane part). The system and method may be implemented by an original equipment manufacturer (OEM) in compliance with military and space regulations. It is conceivable that the disclosed system and method may be implemented in many other composite manufacturing industries.

Figure 1:
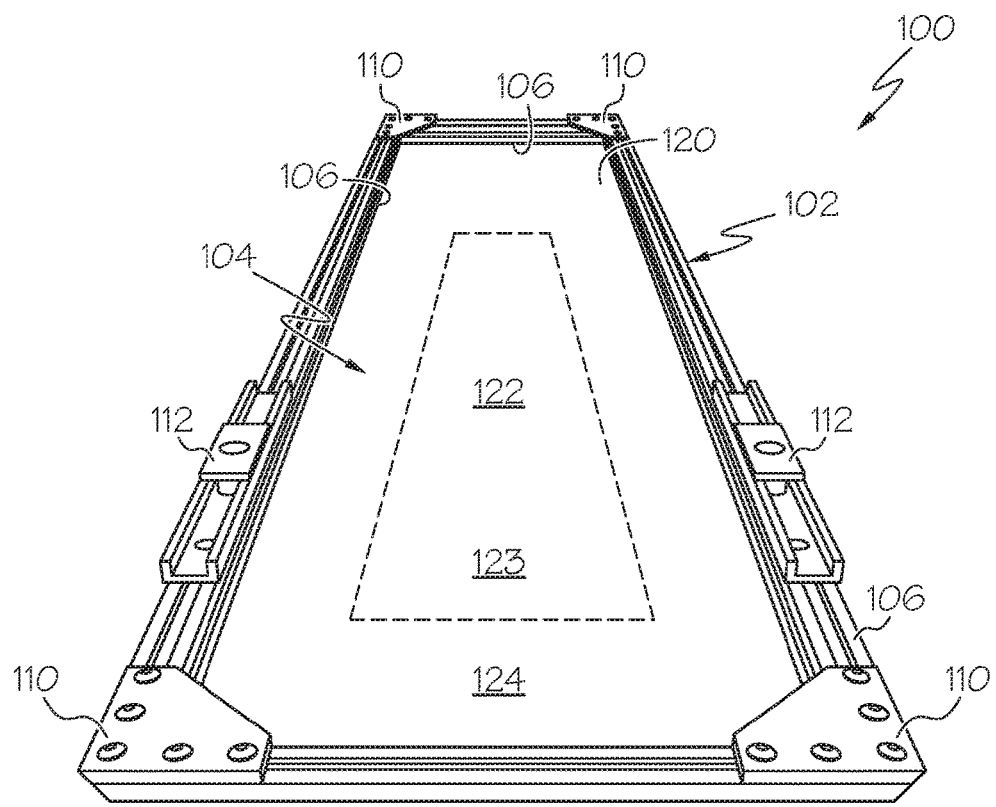
FIG. 1 is a perspective view of a shuttle constructed in accordance with an embodiment.
Figure 2:
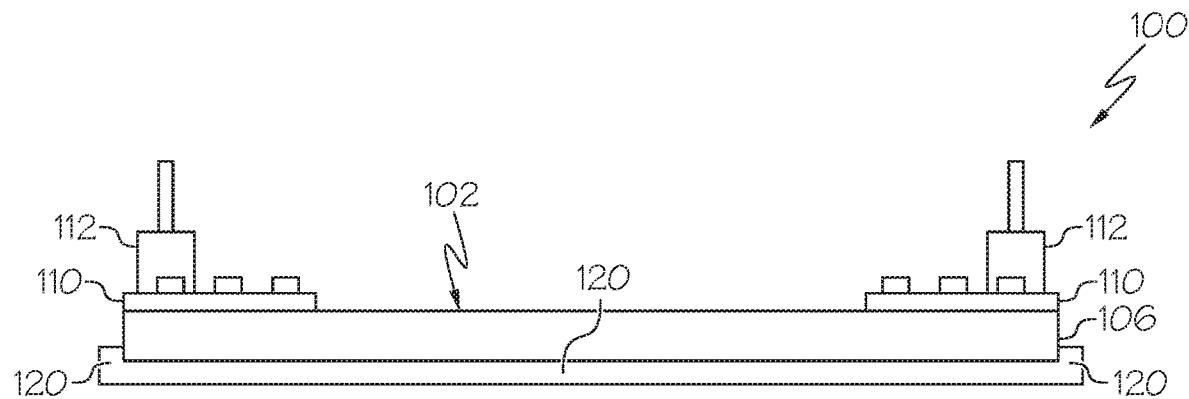
FIG. 2 is an elevational view looking approximately in the direction of arrow "2" shown in FIG. 1.

Referring to FIG. 1, a perspective view of shuttle 100 constructed in accordance with an embodiment is illustrated. FIG. 2 is an elevational view looking approximately in the direction of arrow "2" shown in FIG. 1. The shuttle 100 comprises a frame structure 102 that defines an internal area 104 of the frame structure 102. In some embodiments, the internal area 104 is substantially rectangular-shaped. The frame structure 102 includes frame members 106 secured together with corner plates 110. Mechanical couplings 112 allow the frame structure 102 to be moved by a mover device (not shown). The mover device is capable of moving the frame structure 102 up, down, and laterally, for example.

The shuttle 100 further comprises a sheet 120 of elastic material disposed within the internal area 104 of the frame structure 102. In some embodiments, the sheet 120 of elastic material comprises latex material that spans the rectangular-shaped internal area 104 of the frame structure 102. The sheet 120 of elastic material is stretched over and secured to a top surface of frame members 106.

The sheet 120 of elastic material includes a major surface 122 that can adhere to a net-trimmed composite ply and allow the frame structure 102 with the sheet 120 of elastic material to pick up the composite ply. The sheet 120 of elastic material is stretched flat (no sag) to keep ply alignment. The elasticity and the thickness of the sheet 120 of elastic material depends on what material is used and the shape of the part that is being fabricated. Optionally, the major surface 122 of the sheet 120 of elastic material may include a tacking portion 123 and a vacuum seal portion 124 located outside of the tacking portion 123 of the major surface 122.

Figure 3:
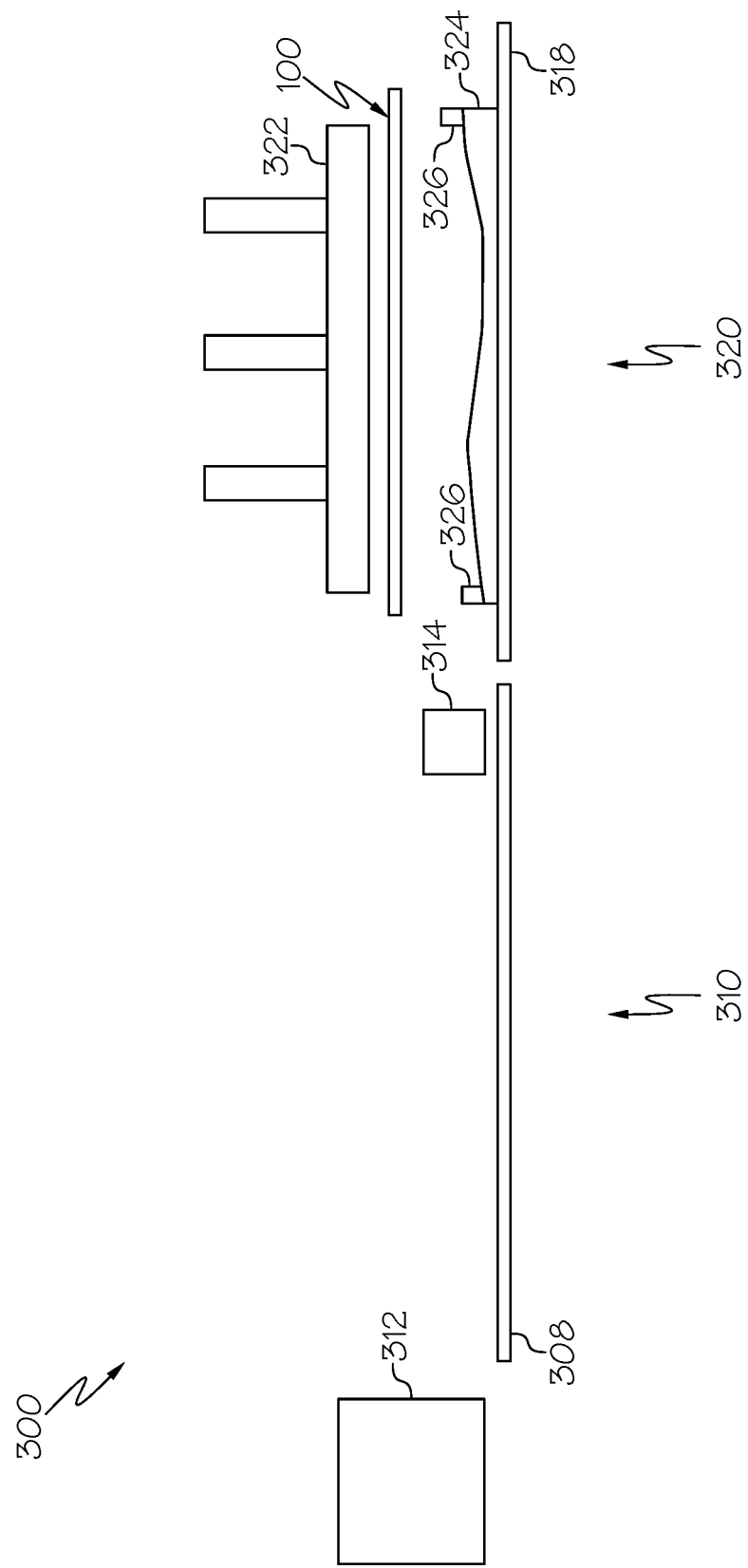
FIG. 3 is a schematic view of an example composite structure manufacturing system embodying the shuttle of FIG. 1, and showing system devices in their home positions.

The shuttle 100 is also provided for facilitating transportation of a net-trimmed composite ply from a ply pickup station 310 (FIG. 3) to a forming station 320 (FIG. 3). In particular, the major surface 122 of the sheet 120 of the elastic material picks up the composite ply at the ply pickup station 310 and transports it to the forming station 320. The distance between the ply pickup station 310 and the forming station 320 may be any distance.

The shuttle 100 is further provided for facilitating compaction of the net-trimmed composite ply at the forming station to form a desired composite ply layup. In particular, the major surface 122 of the sheet 120 of elastic material urges the composite ply onto a forming tool to lay the composite ply on the forming tool or any previously laid plies on the forming tool to compact the one or more composite plies against the forming tool. A desired composite ply layup is thereby fabricated on the forming tool, as is described in detail herein.

Referring to FIG. 3, a schematic view of an example composite structure manufacturing system 300 embodying the shuttle 100 of FIG. 1 is illustrated. FIG. 3 shows system devices of the system 300 in their home positions. More specifically, FIG. 3 shows a ply pickup station 310 that has a laminator head 312 of a laminator and a trim head 314 of a trimmer (e.g., a cutting machine), and a forming station 320 that has a flexible forming press 322 and a forming tool 324 that is disposed below the flexible forming press 322. The forming tool 324 has a lip seal 326. FIG. 3 also shows the shuttle 100 of FIG. 1 in its home position at the forming station 320 between the flexible forming press 322 and the forming tool 324. The shuttle 100 is movable between the forming station 320 and the ply pickup station 310, as will be described herein.

Figure 19:
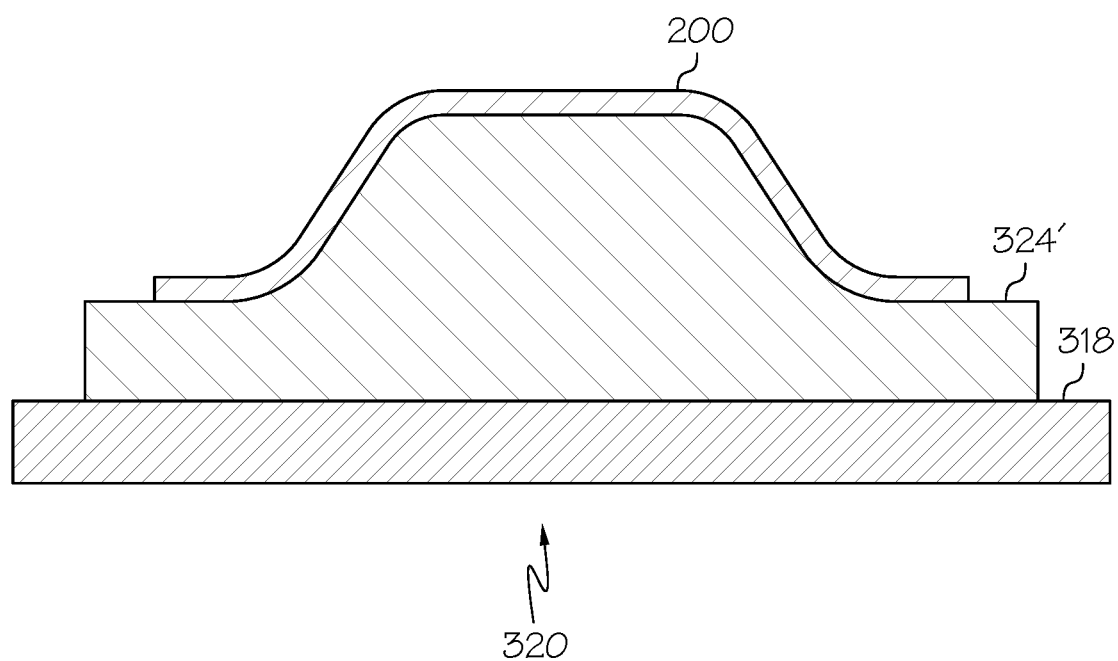
FIG. 19 is a schematic view of an alternative forming tool for use at the forming station.

The forming tool 324 may have various shapes and contours without departing from the scope of the present disclosure. For example, an alternative forming tool 324' shown in FIG. 19 may be configured for the fabrication of hat stringers or the like, and may be placed on the bed/table 318 at the forming station 320.

Figure 4:
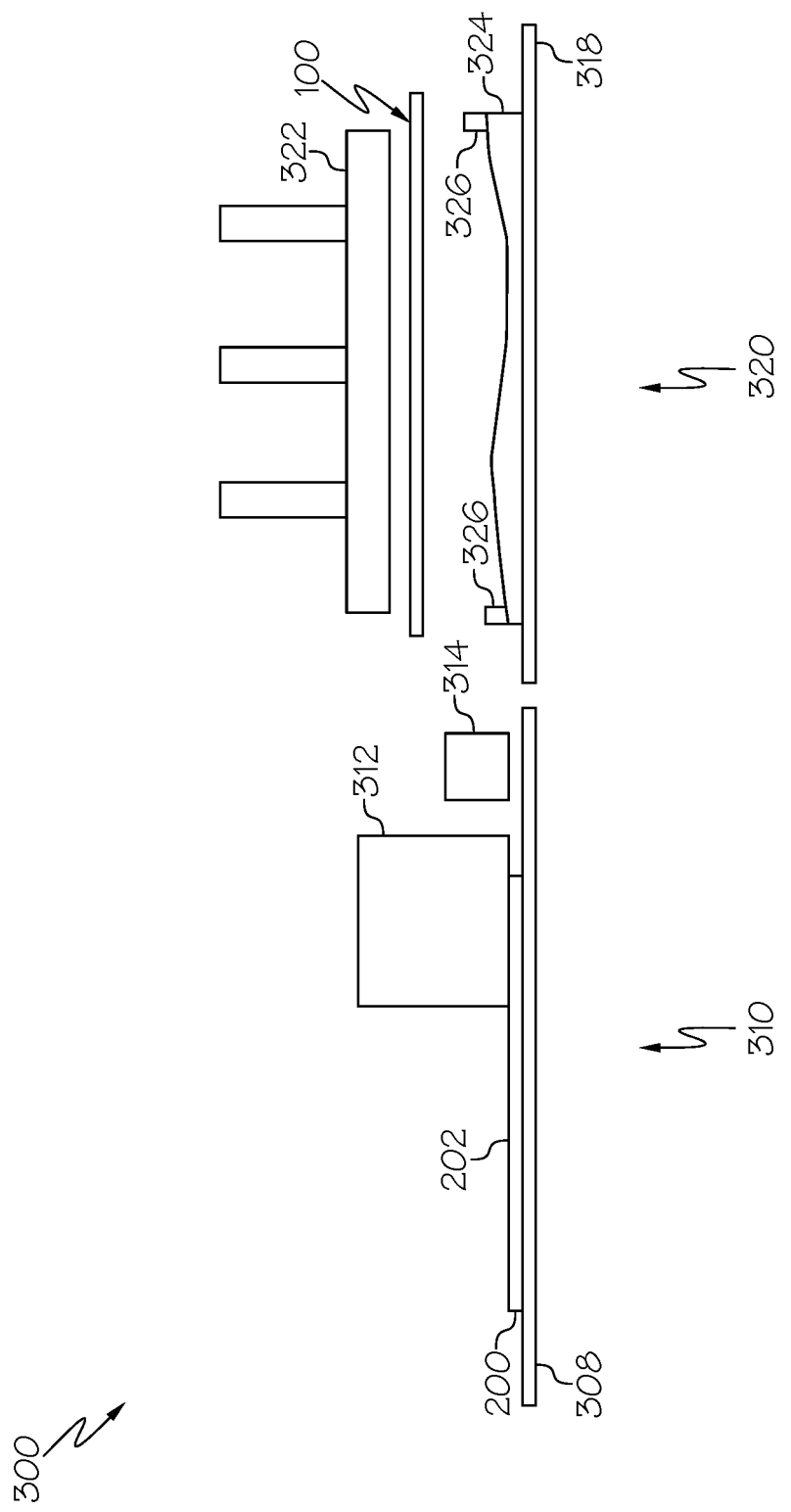
FIG. 4 is a schematic view similar to FIG. 3, and showing a laminator head laminating a composite ply.

Referring to FIG. 4, a schematic view similar to FIG. 3 is illustrated. More specifically, FIG. 4 shows the laminator head 312 laminating one or more sheets of stock material to form a composite ply 200 that is resting on a bed/table 308 at the ply pickup station 310. As used herein, "ply" includes both the singular (one ply) and plural (plies). The laminator head 312 could apply to the bed/table 308 multiple, parallel, and adjacent strips (e.g., tows or tape of unidirectional reinforced composite material) of composite ply material to provide a sheet (or ply) to be trimmed by the trim head 314. Alternatively, the laminator head 312 could apply to the bed/table 308 a single, integral composite ply material (e.g., fabric) to provide a sheet to be trimmed by the trim head 314. Structure and operation of laminators and laminator heads are known and, therefore, will not be described.

Optionally, a barrier ply 202 is disposed on top surface of the composite ply 200 to reduce an area of the major surface 122 of the sheet 120 of elastic material to which the composite ply 200 can adhere when the composite ply 200 is picked up at the ply pickup station 310. For example, the composite ply 200 may be sourced or manufactured with the barrier ply 202 already connected to the composite ply 200. The barrier ply 202 acts as a barrier between the shuttle 100 and the composite ply 200 so that tacky resin on the composite ply 200 does not stick to the major surface 122 of the sheet 120 of elastic material. The composite ply 200 may comprise carbon-fiber material pre-impregnated (i.e., a prepreg) with epoxy which is a thermoset resin. The carbon-fiber material may instead be impregnated with a thermoplastic resin instead of a thermoset resin.

Thus, the barrier ply 202 may enable release of the sheet 120 of elastic material following forming. The barrier ply 202 may also enhance formability of portions of the part.

Figure 5:
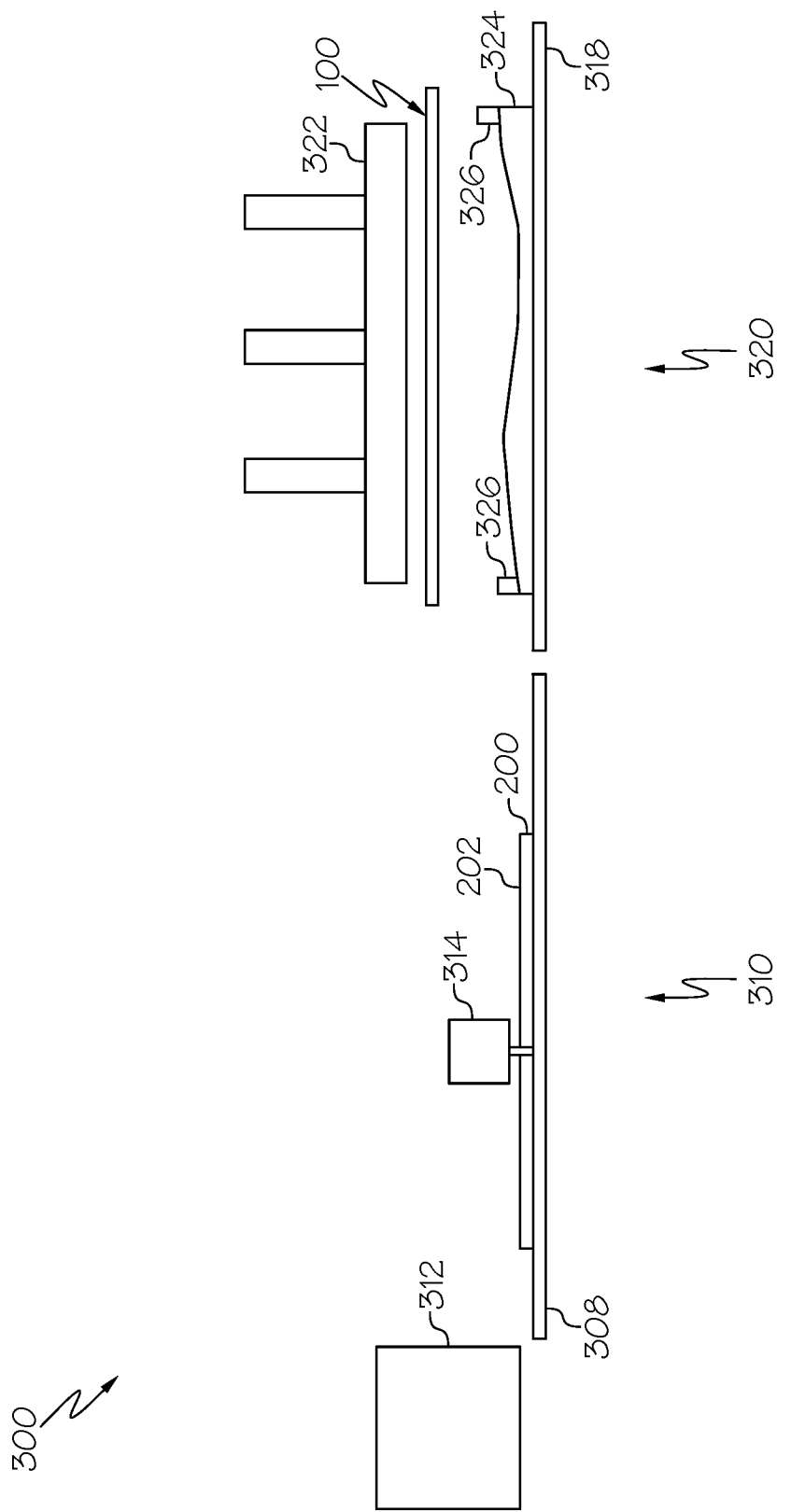
FIG. 5 is a schematic view similar to FIG. 4, and showing a trim head trimming the laminated composite ply of FIG. 4.

Referring to FIG. 5, a schematic view similar to FIG. 4 is illustrated. More specifically, FIG. 5 shows the trim head 314 trimming the laminated composite ply of FIG. 4 to provide a net-trimmed composite ply. The perimeter of the net-trimmed composite ply is located and sized exactly to desired dimensions without trimming to size after layup of the net-trimmed composite ply. Structure and operation of trimmers and trim heads are known and, therefore, will not be described.

Figure 6:
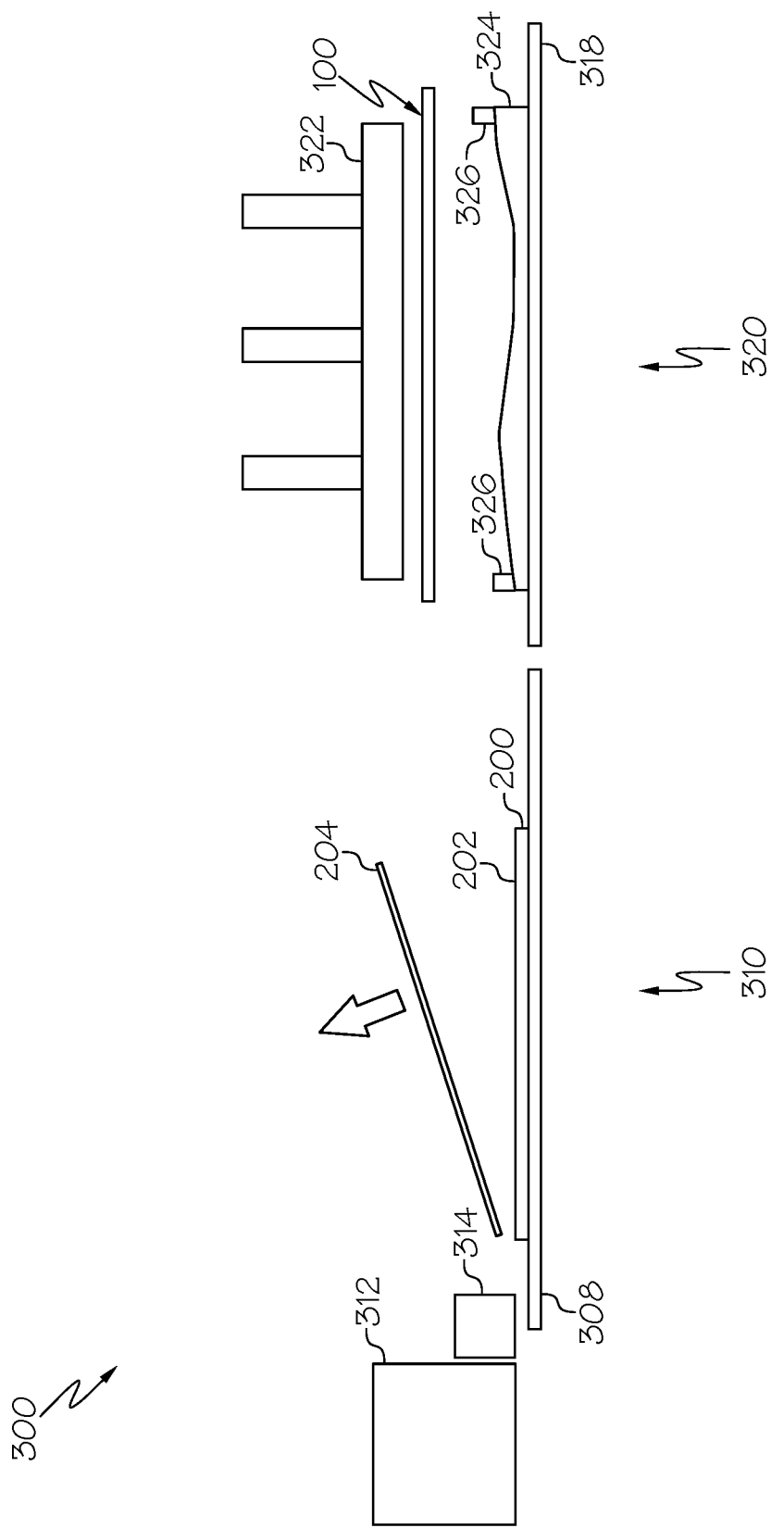
FIG. 6 is a schematic view similar to FIG. 5, and showing a scrap remover removing scrap from the trimmed composite ply of FIG. 5.

Referring to FIG. 6, a schematic view similar to FIG. 5 is illustrated. More specifically, FIG. 6 shows a scrap remover (not shown) removing scrap 204 from the trimmed composite ply 200 of FIG. 5. The removing of the scrap 204 may be automatically performed by a machine or manually performed by a human operator. The scrap 204 is excess material trimmed from the composite ply 200, and may comprise one or more pieces. While the one or more pieces of the scrap 204 is being removed, the trim perimeter of the composite ply 200 can be verified.

Figure 7:
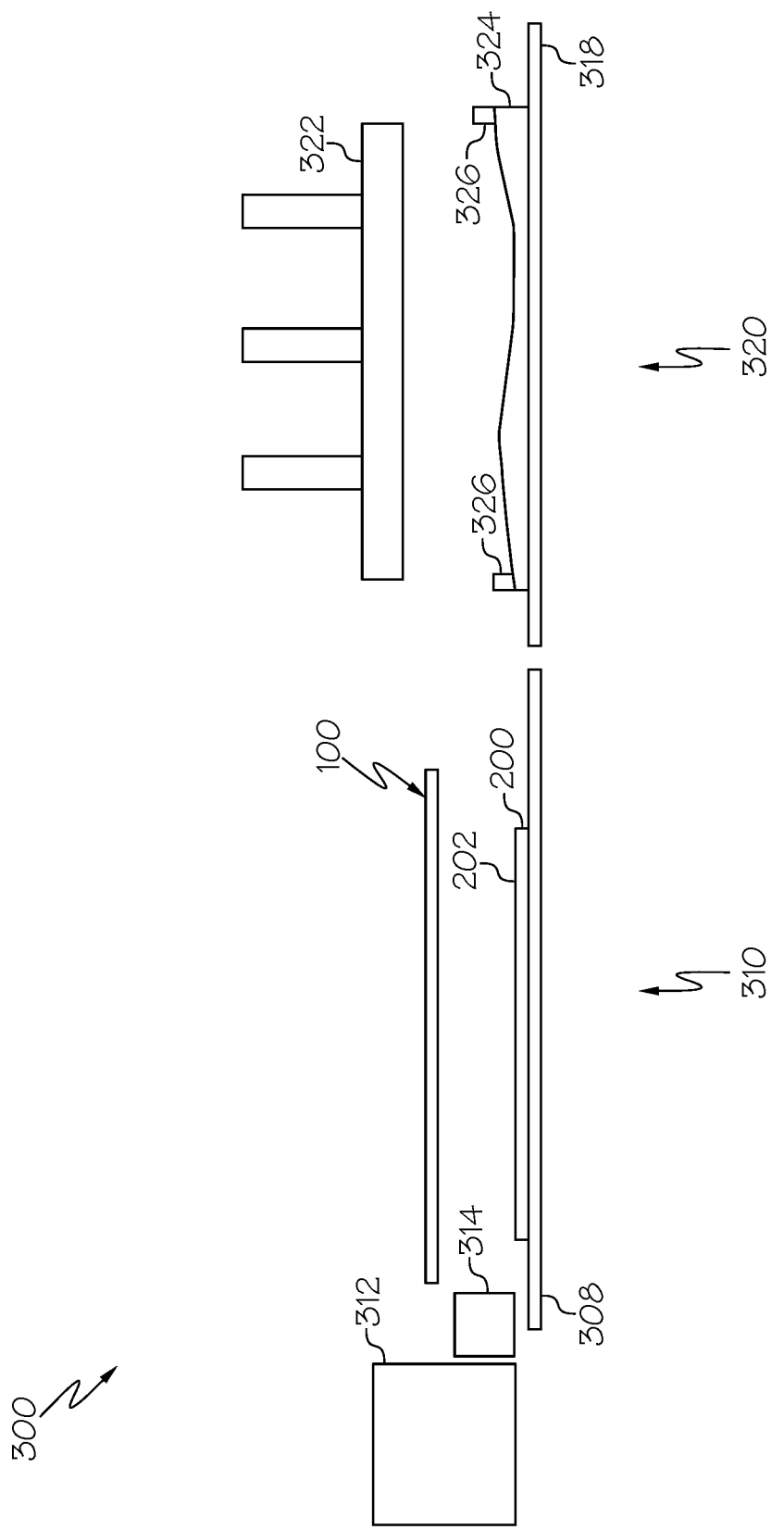
FIG. 7 is a schematic view similar to FIG. 6, and showing the shuttle of FIG. 1 moved over the composite ply of FIG. 6.

Referring to FIG. 7, a schematic view similar to FIG. 6 is illustrated. More specifically, FIG. 7 shows the shuttle 100 moved over the composite ply 200 of FIG. 6. The shuttle 100 can be moved from the position of FIG. 6 to the position of FIG. 7 by using any suitable movement machine or device. Alternatively, the shuttle 100 could be manually moved by a human operator.

Figure 8:
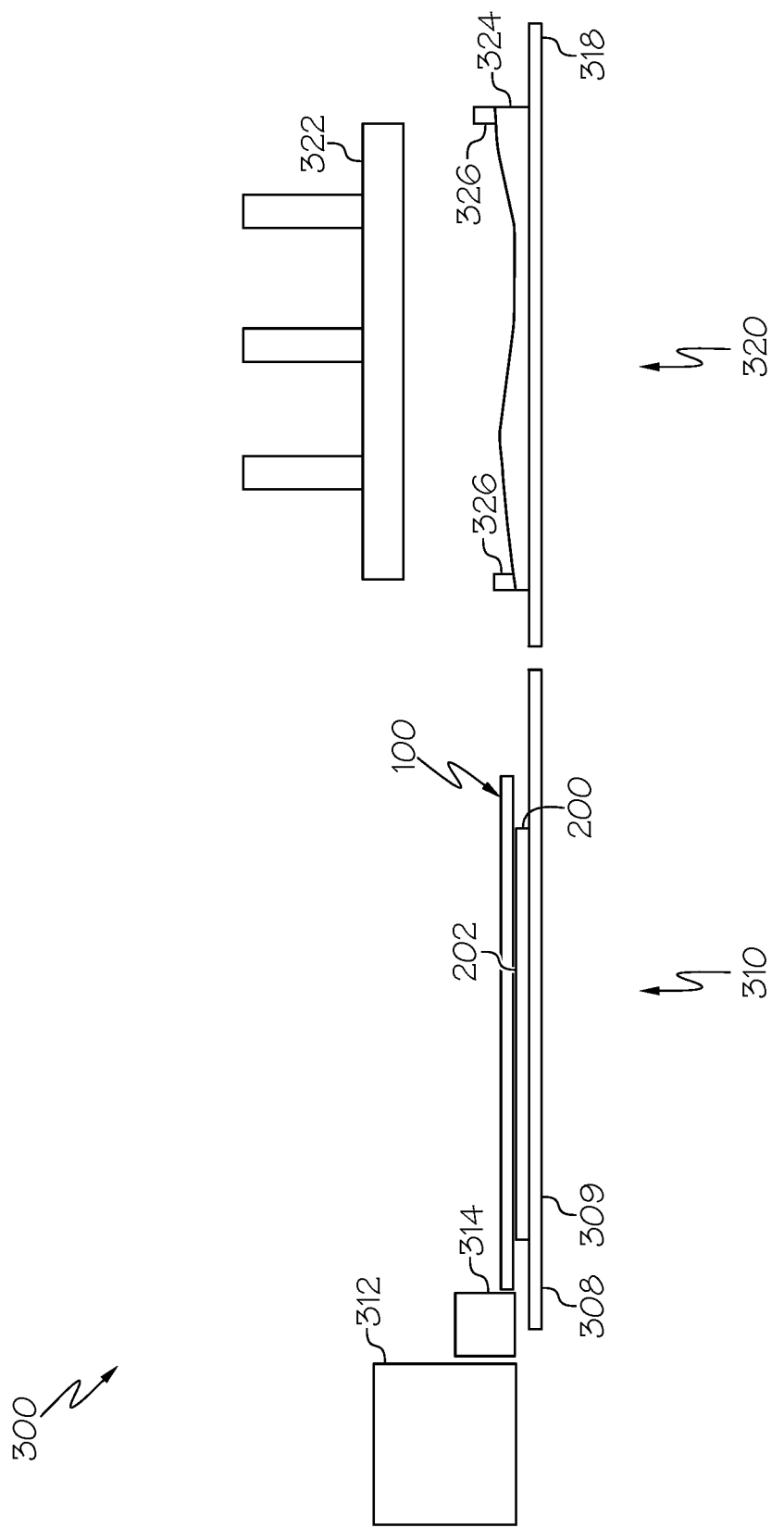
FIG. 8 is a schematic view similar to FIG. 7, and showing the shuttle lowered onto the composite ply of FIG. 7.

Referring to FIG. 8, a schematic view similar to FIG. 7 is illustrated. More specifically, FIG. 8 shows the shuttle 100 lowered onto the composite ply 200 of FIG. 7. When the shuttle 100 is lowered from the position of FIG. 7 to the position of FIG. 8 onto the composite ply 200 of FIG. 7, the composite ply 200 tack-adheres (via the resin of the composite ply) to the major surface 122 of the sheet 120 of elastic material. The elasticity of the sheet 120 allows the composite ply 200 to be compacted between the bed/table 308 and the major surface 122 of the sheet 120 of elastic material.

Still referring to FIG. 8, optionally, the bed/table 308 at the ply pickup station 310 may be a vacuum bed/table 309. Therefore, when the shuttle 100 is lowered from the position of FIG. 7 to the position of FIG. 8 into engagement with the composite ply 200, vacuum suction from the vacuum bed/table 309 draws the vacuum seal portion 124 (FIG. 1) of the sheet 120 of elastic material on the shuttle 100 toward the vacuum bed/table 309, thereby compacting the composite ply 200 between the tacking portion 123 (FIG. 1) of the sheet 120 of elastic material and the vacuum bed/table 309. As such, the use of vacuum suction may provide better tack-adherence of the composite ply 200 to the major surface 122 of the sheet 120 of elastic material.

Figure 9:
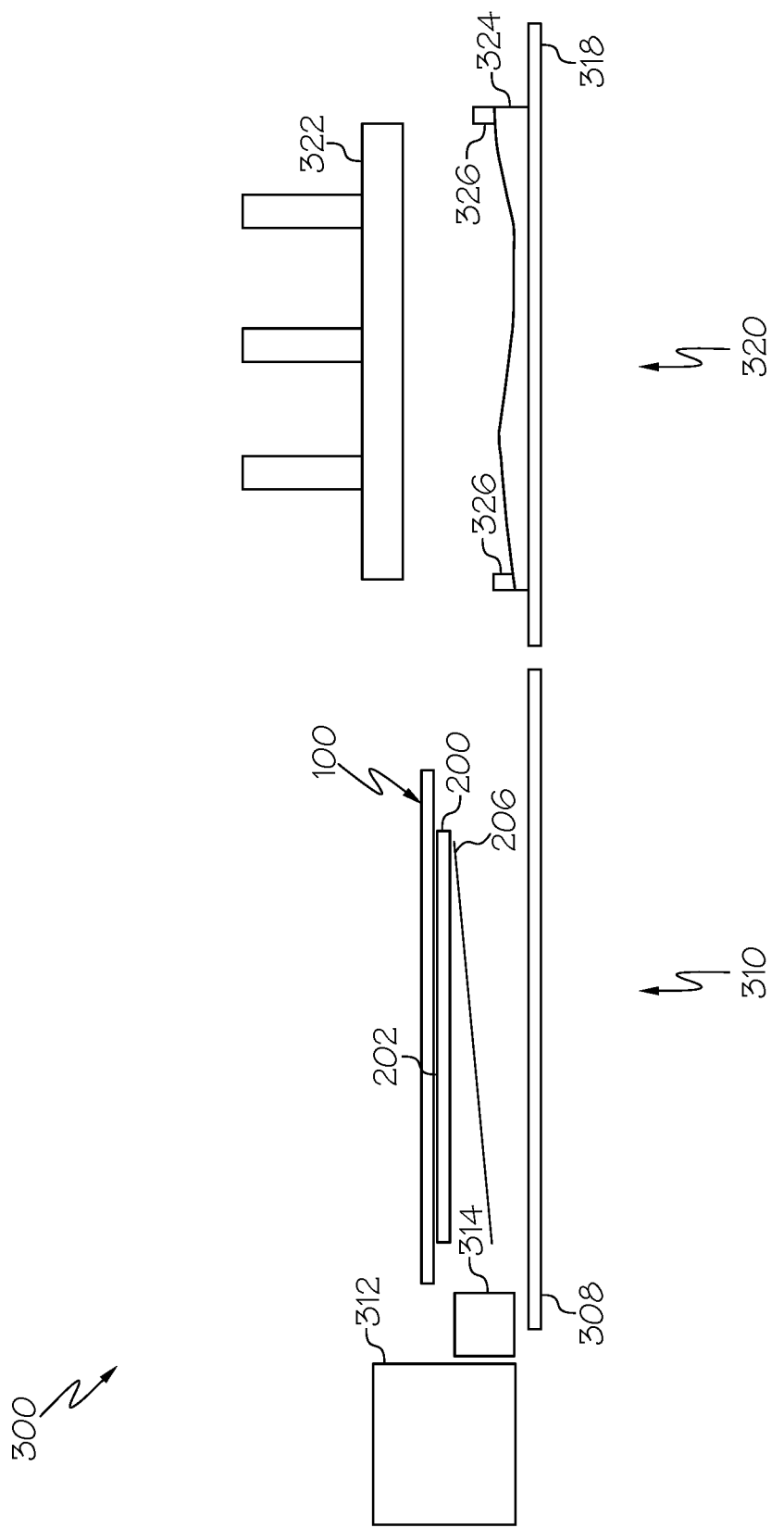
FIG. 9 is a schematic view similar to FIG. 8, and showing the shuttle picking up the composite ply of FIG. 8 and removing backing paper from the composite ply.

Referring to FIG. 9, a schematic view similar to FIG. 8 is illustrated. More specifically, FIG. 9 shows the shuttle 100 picking up the composite ply 200 of FIG. 8 and removing backing paper 206 from the composite ply 200. As the shuttle 100 moves from the position of FIG. 8 to the position of FIG. 9, the backing paper 206 is removed from the underside of the composite ply 200. The removing of the backing paper 206 may be automatically performed by a machine or manually performed by a human operator.

Figure 10:
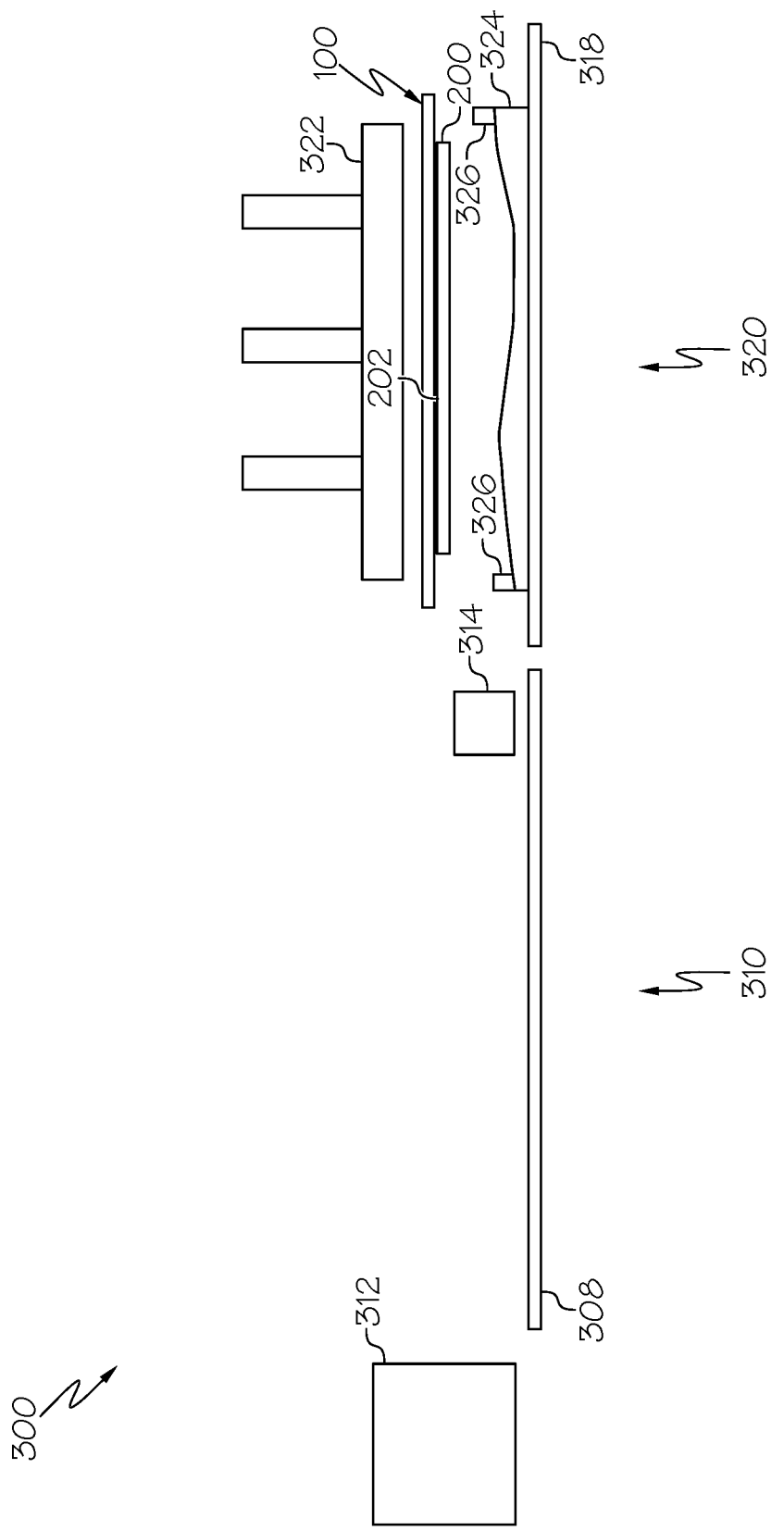
FIG. 10 is a schematic view similar to FIG. 9, and showing the shuttle with the composite ply of FIG. 9 moved over a forming tool.

Referring to FIG. 10, a schematic view similar to FIG. 9 is illustrated. More specifically, FIG. 10 shows the shuttle 100 with the composite ply 200 of FIG. 9 moved over the forming tool 324 at the forming station 320. The forming tool 324 is shown resting on a bed/table 318 at the forming station 320. As the shuttle 100 moves from the position of FIG. 9 to the position of FIG. 10, the trim head 314 can move back from the position of FIG. 9 to its home position shown in FIG. 10. The trim head 314 can move back to its home position at any time, and does not have to occur only during movement of the shuttle 100 from the position of FIG. 9 to the position of FIG. 10. In FIG. 10, the shuttle 100 is in a position ready to be lowered onto the forming tool 324 or any previously laid plies on the forming tool 324.

The shuttle 100 can be lowered onto the forming tool 324 (or any previously laid plies on the forming tool 324) using a computer numerically-controlled (CNC) based system, for example. As another example, the shuttle 100 can be lowered onto the forming tool 324 using physical tooling indexing features such as indexing pins/bushings or cups/cones. Structure and operation of indexing pins/bushings and cups/cones are known and conventional and, therefore, will not be described.

Figure 11:
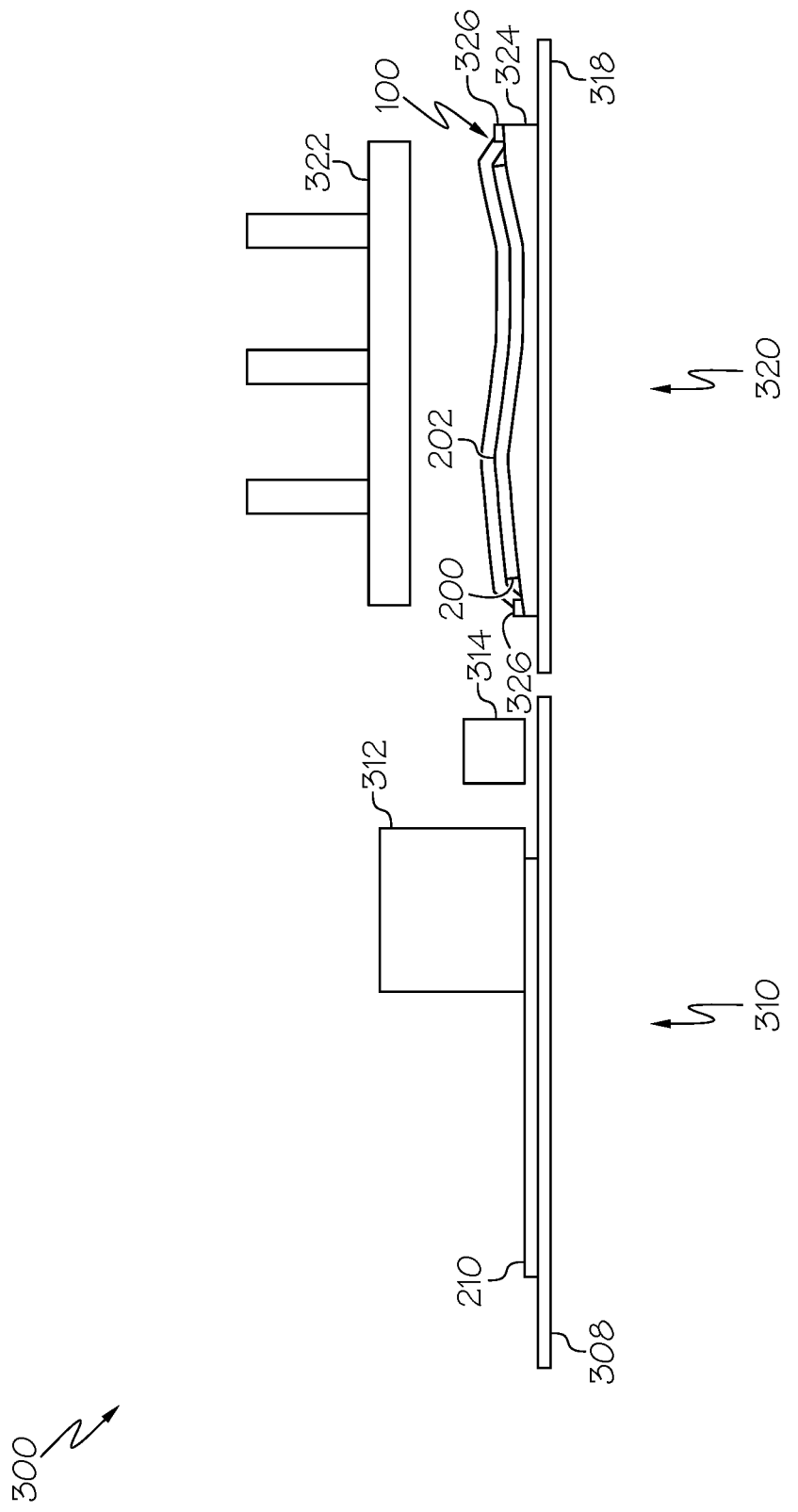
FIG. 11 is a schematic view similar to FIG. 10, and showing the shuttle placing the composite ply of FIG. 10 onto the forming tool (lamination occurs at the ply pickup station).

Referring to FIG. 11, a schematic view similar to FIG. 10 is illustrated. More specifically, FIG. 11 shows the shuttle 100 placing the composite ply 200 of FIG. 10 onto the forming tool 324. The vacuum seal portion 124 (FIG. 1) of the major surface 122 (FIG. 1) of the sheet 120 (FIG. 1) of elastic material on the shuttle 100 may engage the lip seal 326 on the forming tool 324 as the composite ply 200 is placed onto the forming tool 324, thereby facilitating compaction of the composite ply 200 onto the forming tool 324. As the shuttle 100 moves from the position of FIG. 10 to the position of FIG. 11, the laminator head 312 can move from its home position of FIG. 10 to begin laminating another composite ply 210 at the ply pickup station 310 as shown in FIG. 11. The laminator head 312 can move from its home position to begin laminating the composite ply 210 at any time, and does not have to occur only during movement of the shuttle 100 from the position of FIG. 10 to the position of FIG. 11. Each of the one or more sheets of the laminated composite ply 210 can have a fiber orientation of parallel fibers. Each of the one or more sheets of the laminated composite ply 210 can have the same or different fiber orientations.

The shuttle 100 can place the composite ply 200 of FIG. 10 onto the forming tool 324 (or any previously laid plies on the forming tool 324) using a computer numerically-controlled (CNC) based system, for example. As another example, the shuttle 100 can place the composite ply of FIG. 10 onto the forming tool 324 using physical tooling indexing features such as indexing pins/bushings or cups/cones. Structure and operation of indexing pins/bushings and cups/cones are known and conventional and, therefore, will not be described. As yet another example, the shuttle 100 can place the composite ply of FIG. 10 onto the forming tool 324 using one or more sensors, with feedback control (either with or without the assistance of a computer numerically-controlled (CNC) based system.

Figure 12:
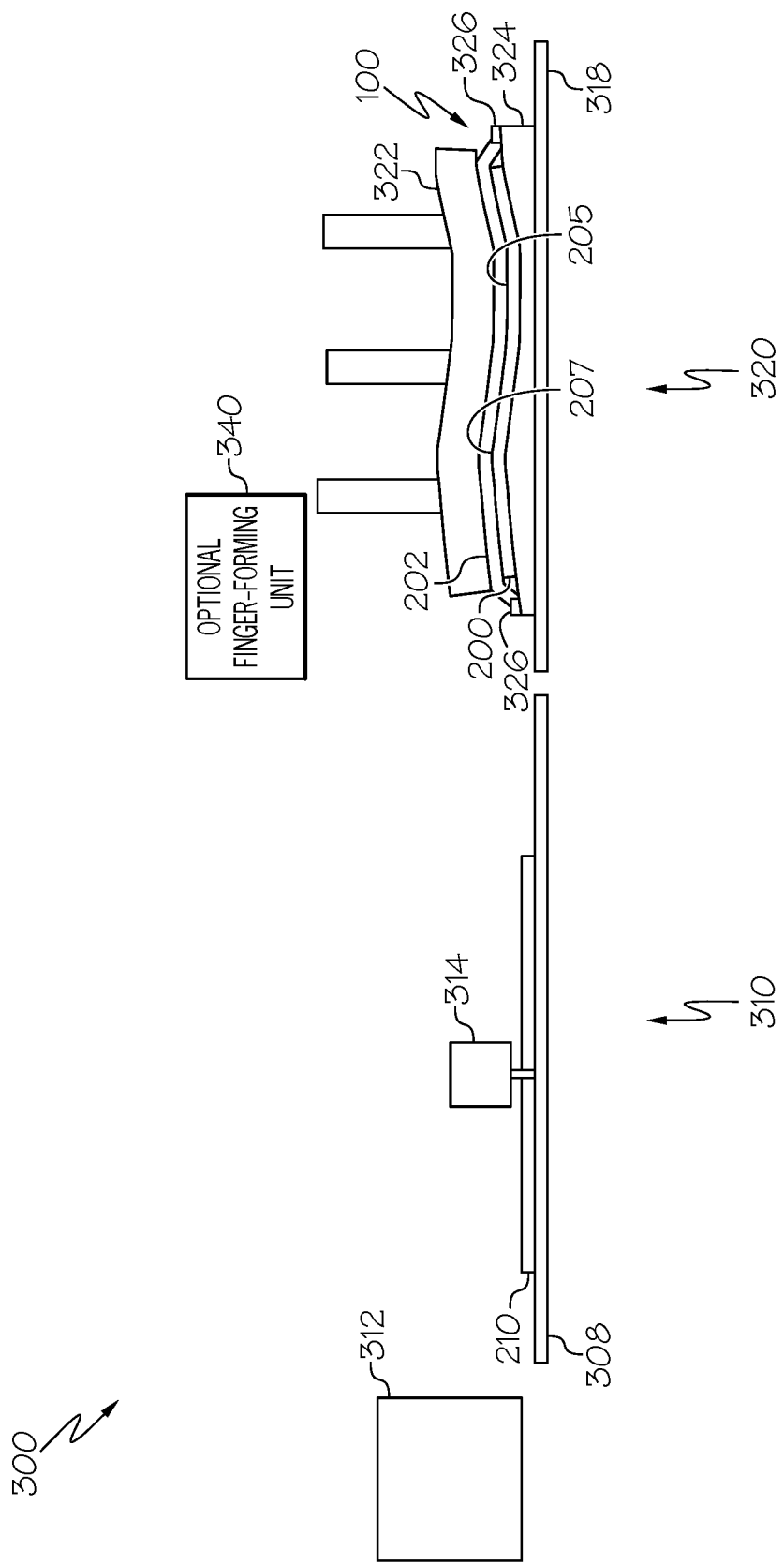
FIG. 12 is a schematic view similar to FIG. 11, and showing a flexible forming press lowered onto the shuttle to compact the composite ply of FIG. 11 between the shuttle and the forming tool (trimming occurs at the ply pickup station).

Referring to FIG. 12, a schematic view similar to FIG. 11 is illustrated. More specifically, FIG. 12 shows the flexible forming press 322 lowered onto the shuttle 100 to compact the composite ply 200 between the shuttle 100 and the forming tool 324. As the shuttle 100 is being lowered from the position of FIG. 10 to the position of FIG. 12, portions of the flexible forming press 322 flex and bend to conform to the shape of the forming tool 324. When this occurs, the composite ply 200 is compacted between the forming tool 324 and the flexible forming press 322. The composite ply 200 consolidates to the shape of the forming tool 324. While the shuttle 100 is located at the forming station 320, the laminator head 312 and the trim head 314 can prepare the next composite ply 210 at the ply pickup station 310.

The above-described process of picking up the composite ply 200 at the ply pickup station 310, transporting it to the forming station 320, and then lowering it onto the forming tool 324 is repeated for any additional number of composite plies that may be desired. This is a process that involves placing the composite ply 200 at the highest point and then smoothing out the ply against the forming tool 324 (or any previously laid plies on the forming tool 324) to prevent wrinkle formation. All air (and any other gases) is drawn out of the space between the forming tool 324 and the sheet 120 of elastic material, such that atmospheric pressure is acting upon the composite ply 200. This forms a composite ply layup (i.e., a composite preform) on the forming tool 324. After the shuttle 100 places the last composite ply onto the forming tool 324 and the composite ply layup contains the desired number of composite plies, the shuttle 100 remains in the lowered position, as shown in FIG. 12.

An optional finger-forming unit 340 (shown schematically as a block in FIG. 12) can be used with the shuttle 100 to provide mechanical forming of the composite ply 200. The finger-forming unit 340 is lowered onto the shuttle 100 using pneumatic cylinders (not shown) to facilitate shaping of the composite ply 200. The finger-forming unit 340 may comprise any suitable commercially-available finger-forming unit to apply mechanical forming of the composite ply 200, such as in or around contours 205 and inflection points 207. Structure and operation of finger-forming units are known and conventional and, therefore, will not be described.

The composite ply 200 shown in FIG. 12 is in its desired shape corresponding to the shape of the forming tool 324. The composite ply 200 may be allowed to remain in the position of FIG. 12 for as long as desired to allow the composite ply 200 to be more compacted and consolidated. The sheet 120 of elastic material complementarily matches the contours of the forming tool 324 or any previously laid composite plies. For instance, the uppermost portion of the forming tool 324 can be contacted first, and then gradually forming to lower surfaces in a manner that helps forming without adding wrinkles.

Figure 13:
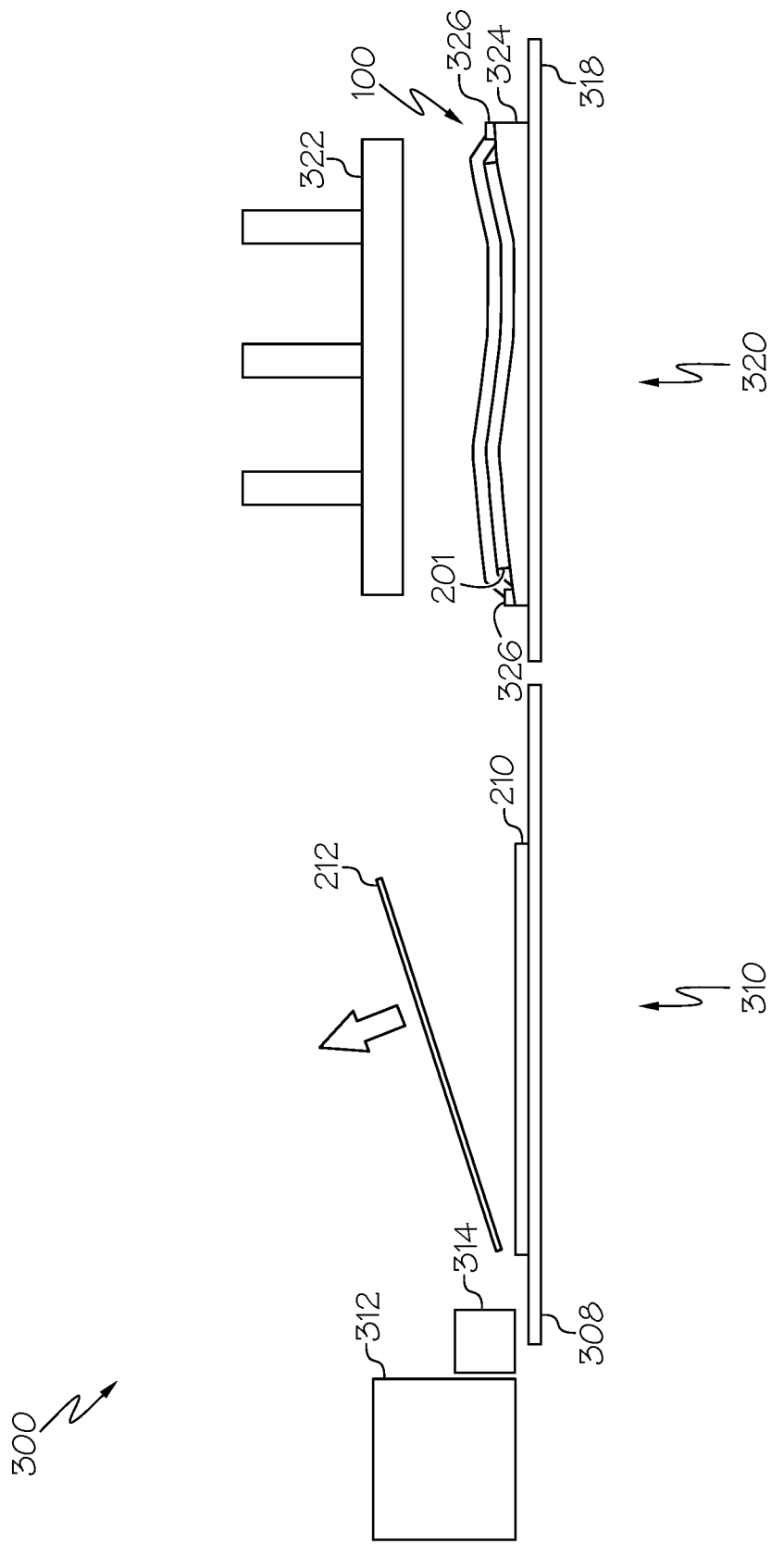
FIG. 13 is a schematic view similar to FIG. 12, and showing the flexible forming press lifted away from the shuttle and the compacted composite ply of FIG. 12 (scrap removal occurs at the ply pickup station).

Referring to FIG. 13, a schematic view similar to FIG. 12 is illustrated. More specifically, FIG. 13 shows the flexible forming press 322 lifted away from the shuttle 100. The consolidated composite ply shown in FIG. 13 is designated with reference numeral "201" to distinguish it over the composite ply 200 shown in FIGS. 4-12. When the shuttle 100 is lifted from the position of FIG. 12 to the position of FIG. 13, the consolidated composite ply 201 can be subjected to further processing (e.g., curing) or one or more additional composite plies may be laid up on the consolidated composite ply 201 to fabricate a layup of consolidated composite plies. As the shuttle 100 moves from the position of FIG. 12 to the position of FIG. 13, the removal of one or more pieces of scrap 212 from the next composite ply 210 at the ply pickup station 310 can begin. The removal of the one or more pieces of scrap 212 can begin at any time, and does not have to occur during movement of the shuttle 100 from the position of FIG. 12 to the position of FIG. 13.

Figure 14:
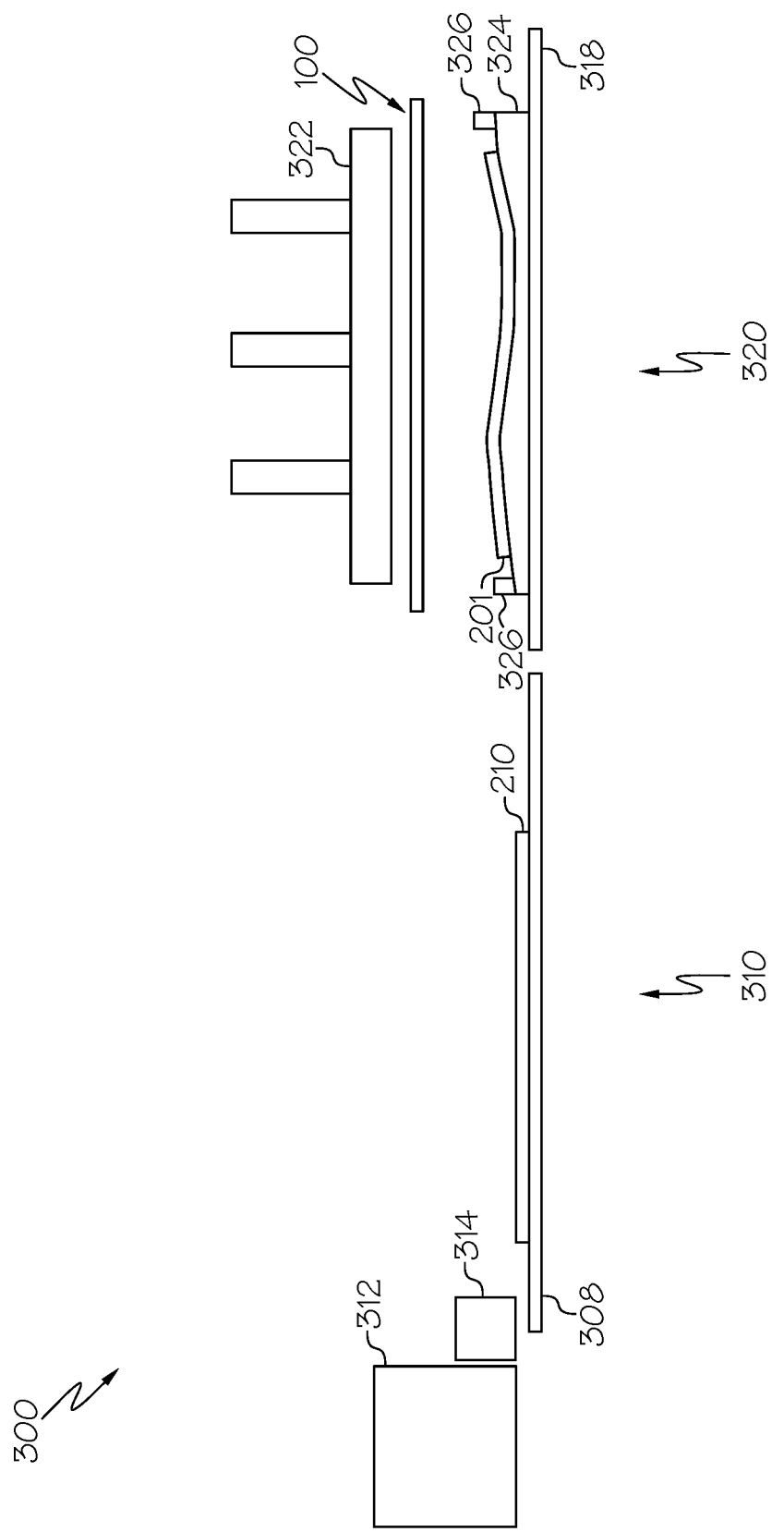
FIG. 14 is a schematic view similar to FIG. 13, and showing the shuttle lifted away from the composite ply of FIG. 13 (the next composite ply is ready at the ply pickup station).

Referring to FIG. 14, a schematic view similar to FIG. 13 is illustrated. More specifically, FIG. 14 shows the shuttle 100 lifted away from the consolidated composite ply 201 of FIG. 13. The consolidated composite ply 201 is adhered to the forming tool 324 or the previously laid composite plies on the forming tool 324 with sufficient forcer such that the ply 201 does not pull off when the ply 201 separates from the sheet 120 of elastic material. It is conceivable that some barrier plies (not shown) be provided on the edge of the consolidated composite ply 201 to help initiate peeling off, as it is not necessary for 100% of the ply 201 to be tacked to the sheet 120 of elastic material. The resulting composite structure (i.e., the consolidated composite ply 201) with the desired shaped can be removed from the forming tool 324.

Figure 15:
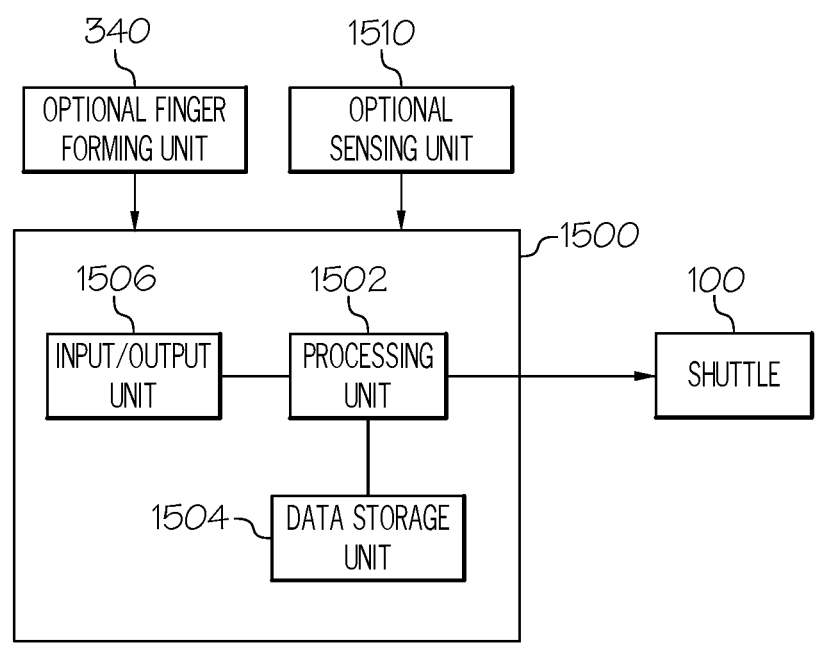
FIG. 15 is an example computer system associated with the shuttle of FIG. 1 and capable of controlling devices to fabricate a composite structure.

Referring to FIG. 15, illustrated is an example computer system 1500 associated with the shuttle 100 of FIG. 1 and capable of controlling devices to fabricate the consolidated composite ply 201 (FIGS. 13 and 14) or a layup of consolidated composite plies. Computer system 1500 includes processing unit 1502 that executes instructions stored in internal data storage unit 1504, external data storage unit (not shown), or a combination thereof. Processing unit 1502 may comprise any type of technology. For example, processing unit 1502 may comprise a general-purpose electronic processor. Other types of processors and processing unit technologies are possible. Internal data storage unit 1504 may comprise any type of technology. For examples, internal data storage unit 1504 may comprise random access memory (RAM), read only memory (ROM), solid state memory, or any combination thereof. Other types of memories and data storage unit technologies are possible.

Computer system 1500 further includes a number of input/output (I/O) devices 1506 that may comprise any type of technology. For example, I/O devices 1506 may comprise a keypad, a keyboard, a touch-sensitive display screen, a liquid crystal display (LCD) screen, a microphone, a speaker, or any combination thereof. Other types of I/O devices and technologies are possible. An optional sensing unit 1510 provides input signals to the computer system 1500. The optional finger-forming unit 340 described herein may also provide input signals to the computer system 1500.

The processing unit 1502 controls the shuttle 100 to pick up cut pieces of composite ply, transport pieces of composite ply, and place pieces of composite ply, as described hereinabove. The processing unit 1502 also controls the optional finger-forming unit 340.

The computer system 1500 may comprise a CNC based system. The CNC based system relies on location coordinates (e.g., (x, y, z) coordinates) that are part of the parameters of a pre-created CNC program that is stored in the data storage unit 1504 of the computer system 1500. The stored location coordinates enable control of the shuttle 100 and the finger-forming unit 340.

The location coordinates of a composite ply on the bed/table 308 at the ply pickup station 310 are stored in the pre-created NC program. The stored location coordinates of a composite ply tell the shuttle 100 the location where it needs to move to pick up the composite ply. The stored coordinates of the composite ply also tell the shuttle 100 the location where it needs to move to transport the composite ply over to the forming tool 324 on the bed/table 318 at the forming station 320. This process is repeated for all composite plies (i.e., one or more composite plies) that are used to fabricate the resulting composite structure.

The location coordinates of the optional finger-forming unit 340 are also stored in the pre-created NC program, as well as size and dimensions of finger-forming unit 340 and the configuration of the forming tool 324 where interface is desired on top of shuttle 100. This information tells pneumatic cylinders (not shown) or any other types of movement system the location where it needs to move to align so that the finger-forming unit 340 can be lowered at the appropriate location to facilitate fabricating a composite structure. It is conceivable that no sensor is needed to enable the computer system 1500 shown in FIG. 15 to control operation of the shuttle 100 to fabricate a composite structure.

Although the above description describes the computer system 1500 as requiring no sensor to control operation of the shuttle 100, it is conceivable that an optional sensing unit 1510 be provided to determine location and/or to validate location of a composite ply against the location indicated by the location coordinates stored in the NC program. Any detected differences in the location of a composite ply can be adjusted accordingly (via feedback control performed by the processing unit 1502) to accurately align the shuttle 100 with the composite ply. The optional sensing unit 1510 may comprise an overhead camera/optical recognition system, for example. Use of radar or the like for sensing location is also contemplated.

Also, the above-described control system need not be limited to a CNC based system. For example, a robotic system that relies upon sensors or vision to locate a ply prior to pick up can be used. Alternatively, rails and bushings can be used.

Figure 16:
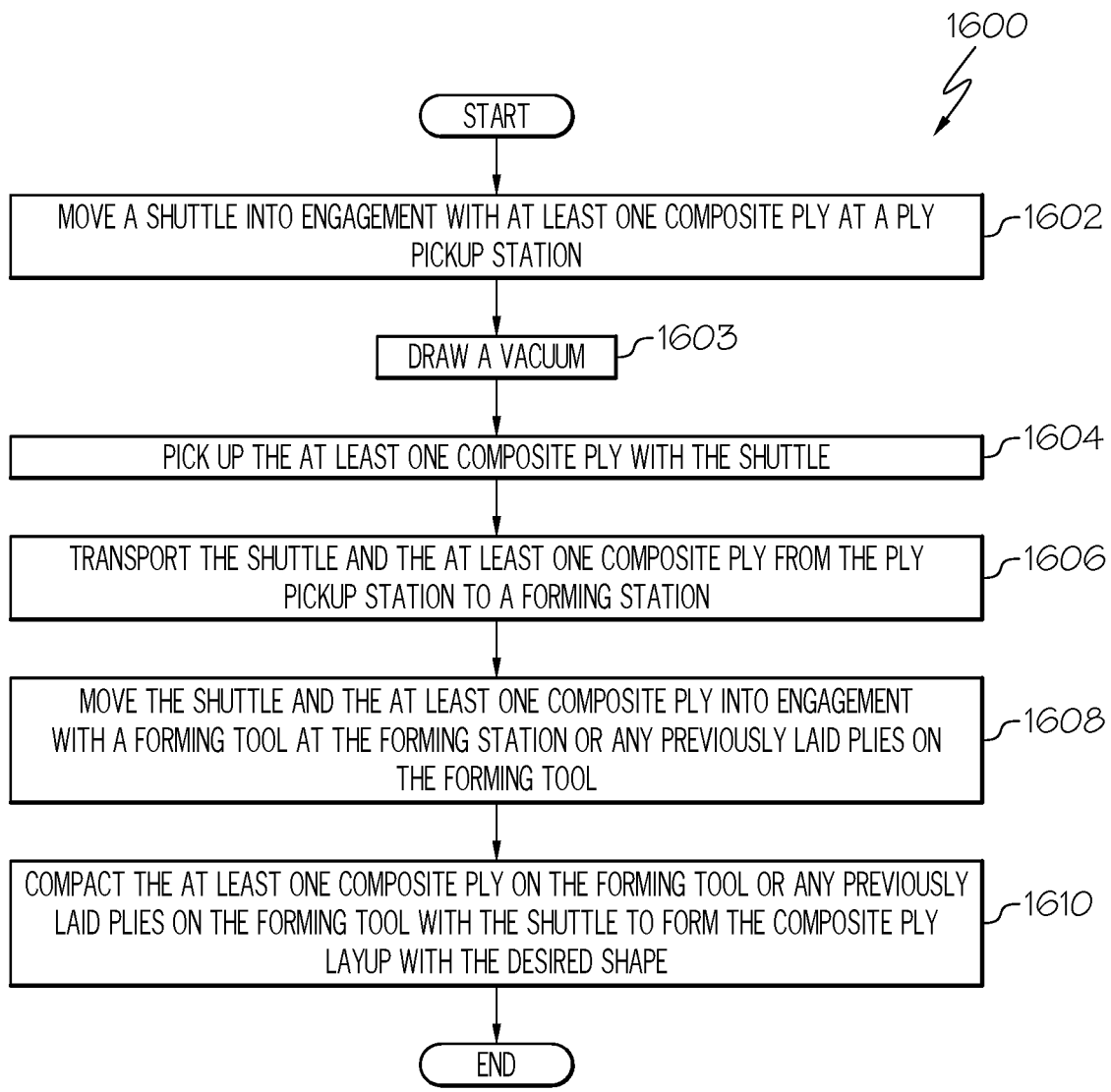
FIG. 16 is a flow diagram depicting an example method for fabricating a composite ply layup with a desired shape in accordance with an embodiment.

Referring to FIG. 16, a flow diagram 1600 depicts an example method for operating the example computer system of FIG. 15 to control operation of the shuttle 100 to fabricate a composite ply layup in accordance with an embodiment. In block 1602, a shuttle having a sheet of elastic material is moved into engagement with at least one composite ply at a ply pickup station. Optionally, in block 1603, a vacuum is drawn to urge the sheet of elastic material into engagement with the bed/table at the ply pickup station and, hence, the at least one composite ply, thereby enhancing tack-adherence of the at least one composite ply to the sheet of elastic material. Mechanical pressure can also (or alternatively) be applied during block 1603. The process then proceeds to block 1604 in which the at least one composite ply is picked up with the shuttle. Then, in block 1606, the shuttle and the at least one composite ply are transported from the ply pickup station to a forming station. In block 1608, the shuttle and the at least one composite ply are moved into engagement with a forming tool at the forming station or any previously laid plies on the forming tool. The elasticity of the sheet of elastic material facilitates complementarily matching the contours of the forming tool or any previously laid composite plies on the forming tool. The at least one composite ply is compacted on the forming tool or any previously laid plies on the forming tool with the shuttle to form the composite ply layup with the desired shape, as shown in block 1610. The process then ends.

In some embodiments, the method further comprises net-trimming the at least one composite ply at the ply pickup station.

In some embodiments, the method further comprises removing backing paper from at least one composite ply at the ply pickup station.

In some embodiments, the at least one composite ply is adhered to the sheet of elastic material by tack-adhering the at least one composite ply to the sheet of elastic material, vacuum-adhering the at least one composite ply to the sheet of elastic material, and/or electro-statically adhering the at least one composite ply to the sheet of elastic material.

In some embodiments, a portion of the at least one composite ply is not adhered to the sheet of elastic material. This may aid in forming and release from the at least one composite ply.

In some embodiments, the shape of the at least one composite ply is conformed to the shape of the previously laid plies or the shape of the forming tool to form the desired shape of the at least one composite ply.

In some embodiments, the at least one composite ply is finger-formed to the shape of the previously laid plies or the shape of the forming tool to form the desired shape of the at least one composite ply. Optionally, a slip plane or the like may be disposed between the finger-forming unit and the sheet of elastic material to allow the finger-forming unit to slip into a position relative to the forming tool to apply mechanical pressure, thereby removing bridging across any valleys or points of inflection.

In some embodiments, the method further comprises laminating another at least one composite ply at the ply pickup station when the shuttle and the at least one composite ply are moving into engagement with the forming tool at the forming station or any previously laid plies on the forming tool at the forming station.

In some embodiments, the method further comprises net-trimming another at least one composite ply at the ply pickup station when the shuttle and the at least one composite ply are moving into engagement with the forming tool or any previously laid plies on the forming tool at the forming station.

In some embodiments, the method further comprises removing backing paper from another at least one composite ply at the ply pickup station when the shuttle and the at least one composite ply are moving into engagement with the forming tool or any previously laid plies on the forming tool at the forming station.

In some embodiments of the disclosed method, the at least one composite ply is picked up with the shuttle while the at least one composite ply is flat, and then the shuttle conforms to a contoured forming tool.

It should be apparent that the above-described shuttle 100 is robotically controlled. The need for operating personnel to pick up and transport cut composite plies to a forming tool is eliminated. As such, an automated process is provided to fabricate a composite ply layup. Accordingly, the automated process reduces potential damage to the resulting formed composite structure. However, other options are also contemplated.

It should also be apparent that the processing unit 1502 controls devices including the shuttle 100 to control (i) picking and transporting of at least one composite ply at the ply pickup station 310 based upon sensed ply position information, and (ii) compacting of the composite ply on the forming tool 324 or any previously laid plies on the forming tool 324 at the forming station 320 based upon forming tool position information.

It should further be apparent that the processing unit 1502 controls devices including the shuttle 100 to facilitate (i) picking up at least one composite ply at the ply pickup station 310, (ii) transporting the composite ply to the forming station 320, and (iii) compacting the composite ply on the forming tool 324 or any previously laid plies on the forming tool 324 at the forming station 320 to form the composite ply layup while another composite ply is being processed by either the laminator head 312 or the trim head 314 at the ply pickup station 310. It is conceivable that the laminator head 312 and the trim head 314 are located relative to each other so that a composite ply can be trimmed at the same time the composite ply is being laminated instead of waiting for the composite ply to be fully laminated with the laminator head 312 returned to its home position. This would cut down on the net trim lamination time.

Thus, the shuttle is used both as a transfer medium for transferring a composite ply from the ply pickup station to the forming station, as well as a vacuum bag for forming.

Figure 17:
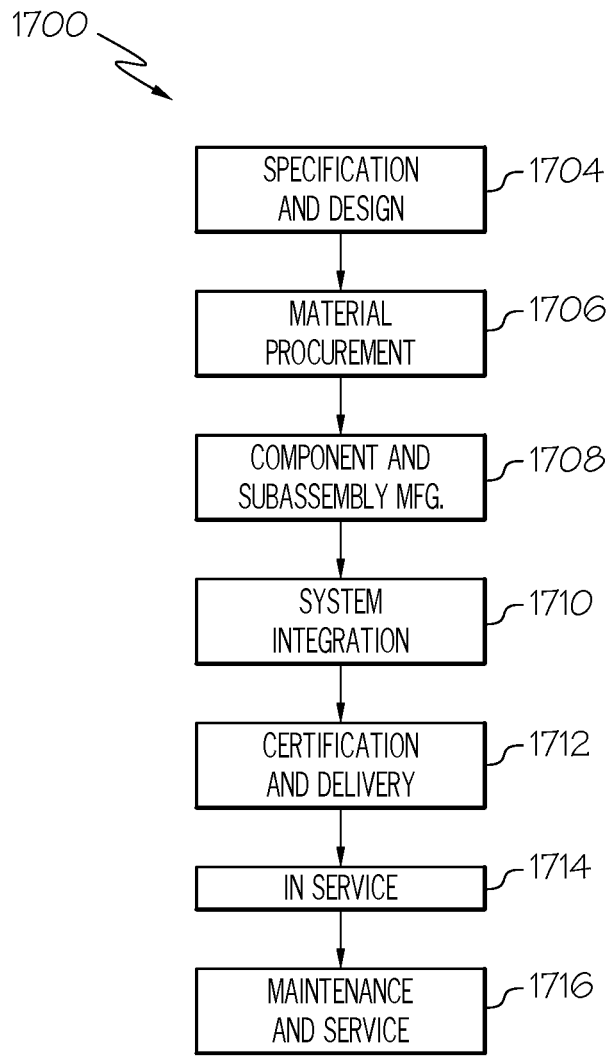
FIG. 17 is a flow diagram of an aircraft manufacturing and service methodology.
Figure 18:
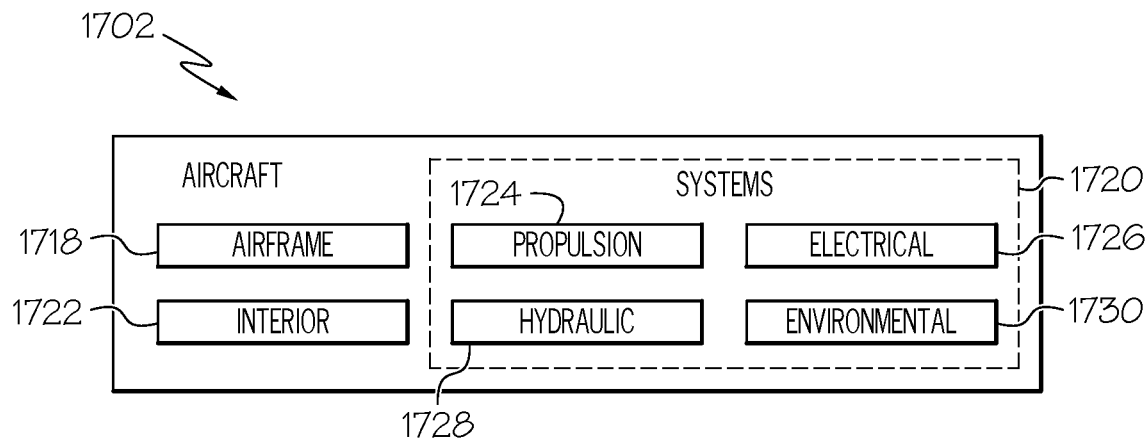
FIG. 18 is a block diagram of an aircraft.

Examples of the disclosure may be described in the context of an aircraft manufacturing and service method 1700, as shown in FIG. 17, and an aircraft 1702, as shown in FIG. 18. During pre-production, the aircraft manufacturing and service method 1700 may include specification and design 1704 of the aircraft 1702 and material procurement 1706. During production, component/subassembly manufacturing 1708 and system integration 1710 of the aircraft 1702 takes place. Thereafter, the aircraft 1702 may go through certification and delivery 1712 in order to be placed in service 1714. While in service by a customer, the aircraft 1702 is scheduled for routine maintenance and service 1716, which may also include modification, reconfiguration, refurbishment and the like.

Each of the processes of method 1700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 18, the aircraft 1702 produced by example method 1700 may include an airframe 1718 with a plurality of systems 1720 and an interior 1722. Examples of the plurality of systems 1720 may include one or more of a propulsion system 1724, an electrical system 1726, a hydraulic system 1728, and an environmental system 1730. Any number of other systems may be included.

The disclosed system and method may be employed during any one or more of the stages of the aircraft manufacturing and service method 1700. As one example, components or subassemblies corresponding to component/subassembly manufacturing 1708, system integration 1710, and/or maintenance and service 1716 may be assembled using the disclosed system method. As another example, the airframe 1718 may be constructed using the disclosed system and method. Also, one or more system examples, method examples, or a combination thereof may be utilized during component/subassembly manufacturing 1708 and/or system integration 1710, for example, by substantially expediting assembly of or reducing the cost of an aircraft 1702, such as the airframe 1718 and/or the interior 1722. Similarly, one or more of system examples, method examples, or a combination thereof may be utilized while the aircraft 1702 is in service, for example and without limitation, to maintenance and service 1716.

Aspects of disclosed embodiments may be implemented in software, hardware, firmware, or a combination thereof. The various elements of the system, either individually or in combination, may be implemented as a computer program product (program of instructions) tangibly embodied in a machine-readable storage device (storage medium) for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

The above-described system and method are described in the context of an aircraft. However, one of ordinary skill in the art will readily recognize that the disclosed system and method are suitable for a variety of applications, and the present disclosure is not limited to aircraft manufacturing applications. For example, the disclosed system and method may be implemented in various types of vehicles including, for example, helicopters, passenger ships, automobiles, marine products (boat, motors, etc.) and the like. Non-vehicle applications are also contemplated.

Also, although the above-description describes a system and method for fabricating a composite structure for an airplane part in the aviation industry in accordance with military and space regulations, it is contemplated that the system and method may be implemented to facilitate fabricating a composite structure in any industry in accordance with the applicable industry standards. The specific system and method can be selected and tailored depending upon the particular application.

Further, although various aspects of disclosed embodiments have been shown and described, modifications may occur to those skilled in the art upon reading the specification. The present application includes such modifications and is limited only by the scope of the claims.

What is claimed is:

1. A method for fabricating a composite ply layup to a shape, the method comprising:
    laminating stock material to form at least one composite ply, wherein the laminating is performed by a laminator at a ply pickup station;
    moving a shuttle into engagement with the at least one composite ply at the ply pickup station, the shuttle comprising a sheet of elastic material;
    picking up the at least one composite ply with the elastic material of the shuttle;
    moving the shuttle and the at least one composite ply into engagement with a tool at a forming station or into engagement with any previously laid plies on the tool, wherein the shuttle is positioned between a flexible forming press and the tool; and
    compacting the at least one composite ply on the tool, or compacting the at least one composite ply and the previously laid plies on the tool, between the shuttle and the tool using the flexible forming press to form the composite ply layup to the shape.

2. The method of claim 1 further comprising:
    placing the at least one composite ply on a table at the ply pickup station.

3. The method of claim 2 further comprising:
    net-trimming the at least one composite ply at the ply pickup station.

4. The method of claim 1 wherein the picking up the at least one composite ply with the elastic material of the shuttle includes:
    tack-adhering the at least one composite ply to the sheet of elastic material.

5. The method of claim 1 further comprising:
    drawing a vacuum to urge the sheet of elastic material into engagement with the at least one composite ply.

6. The method of claim 1 further comprising:
    transporting the shuttle and the at least one composite ply from the ply pickup station to the forming station.

7. The method of claim 1 wherein the picking up the at least one composite ply with the elastic material of the shuttle includes:
    adhering the at least one composite ply to the sheet of elastic material by tack-adhering the at least one composite ply to the sheet of elastic material.

8. The method of claim 1 wherein moving the shuttle and the at least one composite ply into engagement with the tool at the forming station or into engagement with the previously laid plies on the tool includes:
    conforming the at least one composite ply to the previously laid plies or to the tool to form the shape of the composite ply layup.

9. The method of claim 8 wherein conforming the at least one composite ply to the previously laid plies or to the tool to form the shape of the at least one composite ply includes:

finger-forming the at least one composite ply to the previously laid plies or to the tool to form the shape of the composite ply layup.

10. The method of claim 1 further comprising:
laminating stock material to form another at least one composite ply at the ply pickup station when the shuttle and the at least one composite ply are moving into engagement with the tool at the forming station or into engagement with the previously laid plies on the tool at the forming station.

11. The method of claim 10 further comprising:
net-trimming the another at least one composite ply at the ply pickup station when the shuttle and the at least one composite ply are moving into engagement with the tool or into engagement with the previously laid plies on the tool at the forming station.

12. The method of claim 10 further comprising:
removing backing paper from the another at least one composite ply at the ply pickup station when the shuttle and the at least one composite ply are moving into engagement with the tool or into engagement with the previously laid plies on the tool at the forming station.

13. The method of claim 1 wherein the method is performed by a computer having a memory executing one or more programs of instructions which are tangibly embodied in a program storage medium readable by the computer.

14. The method of claim 1 wherein the at least one composite ply comprises carbon-fiber material pre-impregnated with a thermoset resin.

15. The method of claim 1 wherein the at least one composite ply comprises carbon-fiber material pre-impregnated with a thermoplastic resin.

16. The method of claim 1 wherein the moving the shuttle and the at least one composite ply comprises moving the shuttle and the at least one composite ply into engagement with the tool at the forming station.

17. The method of claim 1 wherein the moving the shuttle and the at least one composite ply comprises moving the shuttle and the at least one composite ply into engagement with a previously laid ply of the any previously laid plies on the tool.

18. The method of claim 1 wherein the picking up the at least one composite ply with the shuttle includes:
adhering the at least one composite ply to the sheet of elastic material by vacuum-adhering the at least one composite ply to the sheet of elastic material.

19. The method of claim 1 wherein the picking up the at least one composite ply with the shuttle includes:
adhering the at least one composite ply to the sheet of elastic material by electro-statically adhering the at least one composite ply to the sheet of elastic material.

20. The method of claim 1, wherein the picking up the at least one composite ply with the shuttle is controlled by a controller.

21. The method of claim 1, wherein the compacting the at least one composite ply on the tool, or compacting the at least one composite ply and the previously laid plies on the tool is controlled by a controller.

22. The method of claim 1, wherein the shuttle and the at least one composite ply are moved using a computer numerically-controlled based system.

23. The method of claim 1, wherein the shuttle and the at least one composite ply are moved using indexing features.

24. The method of claim 1, wherein the laminator at the ply pickup station comprises a laminator head.

25. The method of claim 1, wherein the sheet of elastic material comprises latex material.

26. The method of claim 1, wherein the sheet of elastic material comprises a first major surface for tack-adhering the at least one composite ply.

27. The method of claim 26, wherein the first major surface comprises a tacking portion and a vacuum seal portion located outside of the tacking portion of the major surface.

28. The method of claim 1, wherein the sheet of elastic material is disposed within a frame structure of the shuttle.

29. The method of claim 28, wherein the frame structure defines a substantially rectangular-shaped internal area in which the sheet of elastic material is disposed.

30. The method of claim 1, further comprising removing backing paper from the at least one composite ply.

* * * * *